United States Patent [19]

Moilliet et al.

[11] 4,024,089

[45] May 17, 1977

[54] FOAMED ACRYLIC POLYMER FOAM CONTAINING ETHYL CELLULOSE

[75] Inventors: John Lewis Moilliet, Abberley; James Ernest Ryan, Knebworth, both of England

[73] Assignee: Imperial Chemical Industries Limited, London, England

[22] Filed: Apr. 25, 1975

[21] Appl. No.: 571,741

Related U.S. Application Data

[62] Division of Ser. No. 368,024, June 8, 1973, Pat. No. 3,897,371.

[30] Foreign Application Priority Data

June 14, 1972 United Kingdom ............ 27749/72

[52] U.S. Cl. .................... 260/2.5 L; 260/2.5 R; 260/2.5 N; 260/17 R; 264/41; 264/45.5; 428/315

[51] Int. Cl.² ......................................... C08J 9/30

[58] Field of Search ........... 260/2.5 R, 2.5 L, 17 R, 260/2.5 M

[56] References Cited

UNITED STATES PATENTS

| | | | |
|---|---|---|---|
| 3,538,036 | 11/1970 | Peters et al. | 260/17 R |
| 3,669,728 | 6/1972 | Seimer | 260/2.5 M |

*Primary Examiner*—Morton Foelak
*Attorney, Agent, or Firm*—Cushman, Darby & Cushman

[57] ABSTRACT

A method of forming a water-extended polymer from a curable water-immiscible liquid, comprises emulsifying by means of an ethyl cellulose soluble in the curable liquid, a mixture of 60–88% by weight of water and 40–12% by weight of a solution of the ethyl cellulose in the curable liquid wherein the water and the curable liquid respectively comprise the disperse and continuous phases of the emulsion; and curing the liquid while maintaining the emulsion.

6 Claims, No Drawings

FOAMED ACRYLIC POLYMER FOAM CONTAINING ETHYL CELLULOSE

This is a division of application Ser. No. 368,024 filed June 8, 1973 now U.S. Pat. No. 3,897,371.

The invention relates to water-extended polymers, and in particular to means for stabilising the emulsion used to form the polymer.

Water-extended polymers are prepared from emulsions having an aqueous disperse phase and a curable liquid as the continuous phase. The continuous phase is then cured entrapping the discrete water droplets, but many polymers will lose the bulk of the water on standing, to produce a gas filled cellular material. This loss of water may be accelerated by heating. In general, the more extended materials become the commercially more attractive materials since they provide the greater rigidity and bulk for the same quantity of monomers. The degree by which the polymer can be extended, depends on the amount of water which can be incorporated into the emulsion without the emulsion inverting to an oil-in-water emulsion, and this in turn is usually determined in practice by the efficiency of the emulsifier used. However, although it is relatively easy to find emulsifiers capable of providing stable water-in-oil emulsions having low water contents, e.g. up to about 50% by weight of the emulsion, we have previously had difficulty in stabilising high water content emulsions without also acquiring from the emulsifier undesirable side effects such as discolouration of the polymer, or the inhibition of surface glazing under heat and pressure by undue cross-linking.

According to the present invention, we provide a method of forming a water-extending polymer from a curable water-immiscible liquid, comprising emulsifying by means of an ethyl cellulose soluble in the curable liquid, a mixture of 60–88% by weight of water and 40–12% by weight of a solution of the ethyl cellulose in the curable liquid wherein the water and the curable liquid respectively comprise the disperse and continuous phases of the emulsion; and curing the liquid while maintaining the emulsion.

The minimum quantity of ethyl cellulose required to stabilise the emulsion depends partly on the quantity of water to be incorporated. We find that it becomes difficult to obtain a stable emulsion when the quantity of ethyl cellulose is reduced as low as 0.5% by weight of the curable liquid, but such small amounts may be used with the lower water content emulsions. In general, we prefer to use at least 1% by weight of the ethyl cellulose. As the quantity of ethyl cellulose is increased, the viscosity of the emulsion increases. The emulsions produced with higher quantities of cellulose appear to be very stable, but because of the viscosity increase, it becomes more difficult for them to incorporate the larger amounts of water. As water is added to the ethyl cellulose solution, initially it breaks down into small droplets to form an emulsion, very readily. The viscosity increases as further water is emulsified, and the point may eventually be reached where additional water tends to remain as a discrete large droplet rather than being broken down to join the disperse phase of the emulsion. Hence although the emulsions when formed are generally very stable, because of the increasing difficulty in forming them, we find it convenient to use the ethyl cellulose in quantities not exceeding 5% by weight of the curable liquid. For stabilising emulsions containing 70 to 80% by weight of water, ethyl cellulose in quantities of about 2 to 2.5% by weight of the curable liquid, is generally suitable.

As mentioned above, for any given quantity of emulsifier, the viscosity of the emulsion increases as further water is added, until the point is reached at which further water tends to remain as large discrete droplets. It therefore becomes increasingly difficult to obtain a homogeneously small cell size as the water content is increased. We find that we can readily obtain a uniformly textured polymer with emulsions having water contents up to about 80 weight % using suitable shear rates. For forming structural materials in which the cost of raw materials and the density are balanced against strength and rigidity, we prefer to use emulsions which contain at least 70% by weight of water. Hence water contents within the range 70 to 80% by weight of the emulsion are preferred for most purposes. We found it difficult to obtain emulsions which were consistently of the water-in-oil type with water contents in excess of 88 weight %, and although we have achieved stable emulsions containing about 87% by weight of water fairly readily, the structure of the resultant polymer could not be obtained with such visibly uniform consistency.

The only emulsifiers which we had previously found would effectively stabilise high water content emulsions during polymerisation were unsaturated polyesters. By comparison, we find that by not having the polyester's tendency to cross-link the polymers, the present emulsifiers produce polymers which are generally more easy to glaze by fusion of the outer layer of cells; this operation being desirable for most applications. This improvement in the ease of glazing is most noticeable with the higher molecular weight material polymerised without the use of accelerators, e.g. dimethyl-p-toluidine, most of which tend to produce a discoloured polymer. Moreover, when cured at elevated temperatures even without such accelerators being present, polyester emulsified materials still tend to be discoloured. The present emulsifiers therefore enable a greater range of molecular weight materials to be glazed, and consequently enable material to be produced which is more easily glazeable than that which we have previously obtained using polyester emulsifiers.

The curable liquid with which the ethyl cellulose is employed, does not appear to be in any way critical provided it will dissolve the particular ethyl cellulose selected. When we discovered the efficacy of ethyl cellulose, we were looking for a compound capable of stabilising emulsions in which the curable liquid was at least 80% by weight of methyl methacrylate, and we found we could obtain with this monomer the very satisfactory results described herein. However, where polymers having different characteristics are required, there would appear to be no reason why any other liquid monomer in which the cellulose was soluble, should not be satisfactorily emulsified in this manner, and indeed we have not found any such monomer for which the ethyl cellulose was not efficacious as an emulsifier. The ethyl cellulose may be selected according to what curable liquid is employed. By adjustment of the degree of substitution of the cellulose molecule by the introduction of more or less ethoxy groups, the solubility of the resultant substituted cellulose in various solvents may be adjusted. For example, we find that ethyl celluloses having ethoxyl contents of about 45 to 49% are suitable for continuous phases predominantly of methyl methacrylate.

The effectiveness of the ethyl cellulose in any specific application, is also dependent to some extent on the molecular weight of the ethyl cellulose. Thus the greater the molecular weight, the lower is the maximum amount of water which may be incorporated into the emulsion. However, despite the finer cell structure which the lower molecular weight celluloses can produce, we found most surprisingly that the compressive strength was greater using a higher molecular weight material. Viscosity is used commercially as a convenient measure of molecular weight, i.e. the viscosity of a solution of the cellulose under standard conditions. When measuring the viscosities as 5% by weight solutions in a 80:20 toluene: ethanol mixture as solvent, we find that ethyl celluloses giving a viscosity of about 10 cP are very suitable for extending methyl methacrylate in emulsions containing 70 to 80 weight % of water where a fine cell structure is required, but corresponding viscosities of at least 50 cP are preferred where the compressive strength and modulus are more important. Ethyl celluloses having viscosities in the nominal range 10–50 cP have a useful range of properties.

We have found that the rate of shear applied to the water and curable liquid when forming the emulsions, requires careful selection. We find, as illustrated hereinafter by Example 3, that because of the thixotropic nature of ethyl cellulose, there is a range of shear rates which are optimum under any given conditions. Thus for example, while an insufficient rate of shear will not reduce the particle size sufficiently to form a stable emulsion, with too high a shear rate again the emulsion will not be stable. Between such values of shear, will be an optimum shear rate which will produce the desired emulsion, and since this varies with the materials and proportions used, the optimum shear rate is more conveniently found by experimentation.

Water-extended thermoplastic polymers made from emulsions stabilised by the monomer-soluble ethyl celluloses, can be readily glazed when dry by applying heat and pressure to melt the outer layer of cells and thereafter cooling the molten layer to form an integral non-cellular skin of the same composition. Such glazed sheets can be easily shaped by vacuum forming, if desired. Sheets glazed on both sides to form a cellular core sandwiched between non-cellular skins, may be used for example, for doors and panels for cupboards, wardrobes and building structures. We also find that integral transparent or translucent panels may be formed in the doors and panels by pressing the blank sheets between heated dies, suitable die temperatures for polymethyl methacrylate cured at ambient temperatures, being about 175° C with pressures of about 1.7 bar (250 psi), the die being cooled to harden the polymer before withdrawal. Alternatively, the glazed blank may be heated to soften it, 140° C being a suitable temperature for polymethyl methacrylate, and the blank pressed between two dies, suitably some 30° C below the softening point of the polymer, until a transparent panel is formed with a thickness of about that of the two glazed skins. Translucent panels may most readily be formed by incorporating a suitable filler, e.g. chopped glass rovings, into the polymer. The present emulsifiers are particularly suitable for such uses because of the absence of discolouration imparted into the material by their use.

The invention is illustrated by the following examples.

EXAMPLE 1

A 5 cm thick cellular sheet of water-extended polymethyl methacrylate was formed by curing a water-in-oil emulsion at ambient temperatures.

The continuous oil phase of the emulsion consisted of 2% by weight of ethyl cellulose, 10% by weight of 2-ethyl hexyl acrylate, 2% by weight of benzoyl peroxide and 10% by weight of a low molecular weight polymethyl methacrylate ('Diakon' MG101), the balance to 100 weight % being methyl methacrylate in which the other components were dissolved. The ethyl cellulose used was a commercially available grade, N-10, marketed by Hercules Powder Company Limited, having an ethoxyl content specified as falling within the range 47.5 to 49.0% by weight, and having a viscosity at 25° C within the range 8 to 11 cP for a 5 weight % solution in 80:20 toluene-ethanol of a sample dried 30 min at 100° C. 75 parts by weight of water, and 25 parts by weight of the solution in methyl methacrylate, were passed through an emulsifying machine wherein shear was applied to the mixture to form an emulsion in which water formed the disperse phase. As the monomer entered the machine, 1% by weight of dimethyl p-toluidine was injected by a metering pump.

On leaving the emulsifying machine, the emulsion was immediately poured into a cell comprising two glass plates 1 m square, spaced apart by 5 cm. When filled, the cell was left for about 30 min to cure without heat being supplied, the ambient temperature being about 20° C. After curing, the sheet was removed from the cell and dried in a hot air oven for an initial period of 2 days during which time the temperature was kept below 100° C as the bulk of the water was driven off. The temperature was then increased to 110° C for a further 10 days.

The dried sheet was cut through the middle in order that the structure might be examined in the regions which would have experienced the greatest rise in temperature due to the polymerisation exotherm. The polymer had a uniform appearance over the whole area of the section, and a very fine cell size. The colour, however, was a browny yellow due to discolouration by the dimethyl p-toluidine accelerator. Thus while this method provides a very short cycle time, it is only suitable where the discolouration does not matter, e.g. where an appropriately coloured die or pigment is incorporated, or where the discolouration is of a colour suitable for the application.

Both the cut face having the exposed cells, and the glossy surface which had contacted the glass during testing, were found to readily form a glaze when pressed between two polished dies heated to a temperature of 150° C, with a pressure of about 17 bar (250 psi) for about 1 min. The glazed sheet so formed was trimmed and the edges shaped and glazed using profiled glazing plates. Hinges and a catch were all that was then required to finish the sheet as a cupboard door.

EXAMPLE 2

A further sheet of water-extended polymethyl methacrylate was cast with the same dimensions as that of Example 1, but with the polymerisation carried out at elevated temperatures.

The oil phase of the emulsion consisted of 2% by weight of ethyl cellulose (Hercules N-10), 10% by weight of 2-ethyl hexyl acrylate, and 1.5% by weight of tert-butyl perpivolate, the balance to 100% being methyl methacrylate. The emulsion was formed from 75 parts by weight of water and 25 parts by weight of the solution in methyl methacrylate using the emulsifying machine in the same manner as that of Example 1. The emulsion was poured into a glass cell having the same dimensions as that of Example 1, and the filled cell was placed in an oven maintained at 55° C for 4.5 hours to effect polymerisation. After polymerisation was completed, the sheet was removed from the cell and dried in a hot air oven, initially at 95° C for 1 day and then at 115° C for a further 8 days.

A section through the centre of the sheet, showed the structure to have a very uniform appearance, but it was found by photomicrographs to be a little less uniform than can be obtained with an efficient surfactant emulsifier, e.g. an unsaturated polyester such as those described hereinabove. Nevertheless, even the larger cells were shown to be only about 50 $\mu$m in diameter, about 70% of the cells having diameters in the range 5–10 $\mu$m. However, the sheet was white in colour, having no trace of discolouration. Hence by polymerising at elevated temperatures, although a longer cycle time is necessary to prevent boiling of the monomer during the reaction, the appearance is not marred by discolouration of the kind experienced in Example 1. In the glazing test, a good clear glaze could be obtained, but this was not quite so easy to produce as that of Example 1, and a slightly higher pressure of 21–28 bar (300–400 psi) from the heated die maintained at 175° C, was required to give a result of similar appearance to that produced previously.

EXAMPLE 3

A series of experiments were carried out to investigate the effects of different shear rates during the emulsification stage.

The tests were carried out in a box having the approximate dimensions of 1 m × 1 m × 30 cm. The recipe used was that used in Example 2. 58 l of the solution in methyl methacrylate of the ethyl cellulose, 2-ethyl hexyl acrylate and the tert-butyl-perpivolate were placed in the box, and water added at the rate of 10 l min$^{-1}$, until the mixture contained 75% by weight of water. During the addition of the water, the mixture was agitated by a 76 mm diameter poppy head dispersator revolving at a constant rate. The temperature of the water was about 46° C, and the temperature of the final mixture was about 35° C. When all the water had been added, agitation was continued for a further 5 mins, and the dispersator then removed. The mixture in the box was then divided by inserting vertical partitions running in shallow grooves provided in the walls of the box and spaced apart by 5 cm. The open top of the box was then covered and the mixture left to cure for about 24 hours, after which period the sheets were all removed from the mould, and dried as in Example 2.

The effects of four different rates of rotation of the dispersator were examined, being respectively 500, 1000, 1500 and 2500 rpm. The results we obtained were as follows.

500 rpm. After the agitation had been stopped, the mixture started to separate out into three distinct layers being respectively a lower aqueous layer, an upper methyl methacrylate layer, and between these a layer which had the appearance of an emulsion, but no attempt was made to determine whether this was a stable emulsion or whether this also would have separated on standing. This mixture was not polymerised in this state.

1000 rpm. The test was repeated at this higher rate of shear, using fresh components and not those rejected in the first test. When the agitation was complete, the emulsion appeared to be stable and was allowed to cure as specified above. After curing and removal of the sheets, followed by drying and sectioning, the structure was examined. The cells appeared to be fine and uniform, having an appearance essentially the same as that of the sheet produced in Example 2.

1500 rpm. When the dispersator was stopped, the mixture again appeared to have formed a stable emulsion, and polymerisation was completed as before. A section through the dried sheet showed the structure to be uniform, but much coarser than that produced when the dispersator was rotated at only 1000 rpm.

2500 rpm. When the dispersator was stopped, separation of the emulsion phases again started to occur, and this mixture was not polymerised in this state.

EXAMPLE 4

A series of emulsifications and polymerisations were carried out to determine the optimum concentrations of ethyl cellulose for both low and high extensions of the polymerisable liquid.

The recipe was basically that used for polymerisation at elevated temperatures, as described in Example 2. In the first series, only 60% by weight of water (with reference to the total weight of emulsion) was used. This produced a relatively low viscosity emulsion, and therefore it was possible to use higher amounts of the ethyl cellulose. We found that 3% by weight of ethyl cellulose (with reference to the total weight of the oil phase) produced a uniform and fine cellular structure when the emulsion was polymerised. Larger quantities of ethyl cellulose could be incorporated, but these tended to increase the viscosity, and with the more viscous solutions we found there was a tendency to leave discrete droplets of water and air pockets within an otherwise finely structured and stable emulsion. When the quantity of ethyl cellulose was reduced to about 1 weight %, we found that the cells became coarser, although the uniformity of the structure was not noticeably impaired.

Similar experiments were carried out using the same recipe, except that the water content was increased to about 87% by weight of the emulsion. The increase in water content was found to considerably increase the viscosity of the emulsion, and correspondingly only smaller amounts of the ethyl cellulose could be used without the tendency to form discrete water droplets, as found for the more viscous emulsions obtained with the lower water contents. Again on reducing the quantity of ethyl cellulose, the cellular structure became coarser. The optimum quantity was found to be about 1.5 weight %, at which value we were not obtaining any discrete water droplets. However, when compared with the structure using 3 weight % of ethyl cellulose to emulsify 60 weight % of water, as described above, the structure was coarser than that produced previously, but was similarly of uniform appearance.

EXAMPLE 5

A series of experiments were carried out to determine the effect of changing ethyl cellulose parameters. The celluloses used were again commercially available grades N-10, N-50 and K-50 as marketed by Hercules Powder Company Limited. The N and K grades respectively were specified as having an ethoxyl content within the ranges 47.5 – 49.0%, and 45.5 – 46.8% the number specifying the nominal viscosity in cP of a 5 weight % solution in 80:20 toluene:ethanol mixture of a sample dried 30 min. at 100° C. The tolerances quoted are 8-11 cP for the N-10 grade and 40-5% cP for the N-50 and K-50.

The three celluloses were then mixed with catalysed methyl methacrylate in separate test tubes in various quantities up to about 5% by weight. It was found that the N-10 grade gave a clear solution in monomer, but that this went cloudy during polymerisation. The N-50 and K-50 were different from the N-10 in being initially cloudy, but going clear during polymerisation. The K-50 gave a slightly clearer polymer than the N-50.

The two extremes N-10 and K-50, were then used to stabilise emulsions which were then cured. The method used and the composition of the emulsion (except where K-50 grade emulsifier replaced N-10 emulsifier) were those of Example 2. The sheets obtained were tested to find their respective compression strengths as their elastic limits and the compression moduli, using the method of ASTM D 1621. The results were as follows.

| Experiment | Emulsifier | Density g cm$^{-3}$ | Compression Strength psi | Compression Modulus psi |
|---|---|---|---|---|
| 1 | N-10 | 0.21 | 348 | 6300 |
| 2 | N-10 | 0.19 | 364 | 6218 |
| 3 | K-50 | 0.22 | 612 | 7348 |
| 4 | K-50 | 0.21 | 425 | 7249 |

The cellular structure of the sheets was also examined, and it was found that the N-10 samples had a finer structure than the K-50 samples, despite the consistently higher modulus of the latter. With the K-50 grade emulsifiers, the resultant cellular polymer also had a whiter appearance than that made using N-10 grade emulsifier. When the surface of the polymer was pressed under a hot die to form a skin in the manner described in Example 1, the skin of the material using K-50 grade was noticeably clearer than that where N-10 grade was used.

We claim:

1. A thermoplastic acrylic polymer having a cellular structure and consisting essentially of at least 80% by weight of polymerized methyl methacrylate and 0.5 to 5% by weight of an ethyl cellulose soluble in the methyl methacrylate.

2. A cellular polymer according to claim 1 which has been formed from an emulsion in which the disperse phase was aqueous liquid and comprised from 60 to 88% by weight of the emulsion, and the continuous phase was a water-immiscible polymerizable acrylic liquid at least 80% by weight of which was methyl methacrylate.

3. A thermoplastic polymer according to claim 1 which is in the form of a sheet having a cellular core and an integral non-cellular skin of the same composition.

4. A door or panel for a cupboard, wardrobe or building structure, comprising a sheet of thermoplastic polymer as claimed in claim 3.

5. A polymer according to claim 1 in which the ethyl cellulose is such that a 5% by weight solution in an 80:20 toluene:ethanol mixture has a nominal viscosity of 50 cP or more.

6. A polymer according to claim 1 in which the ethyl cellulose is such that a 5% by weight solution in an 80:20 toluene:ethanol mixture has a viscosity in the nominal range 10 to 50 cP.

* * * * *